June 5, 1951 J. M. WALTER 2,556,127
GANG CUTTER
Filed Sept. 29, 1948

INVENTOR.
JOHN M. WALTER.
BY
Allen & Allen
ATTORNEYS.

Patented June 5, 1951

2,556,127

UNITED STATES PATENT OFFICE 2,556,127

GANG CUTTER

John M. Walter, Cincinnati, Ohio, assignor to The G. A. Gray Company, Cincinnati, Ohio, a corporation of Ohio Application September 29, 1948, Serial No. 51,735

6 Claims. (Cl. 29—97)

This invention relates to a gang cutter, and more particularly to gang cutters for use in machine tools of the planer type. By machine tools of the planer type I mean to include all machine tools where a piece of work on a movable bed is moved past a stationary tool, the work moving either in a circular or an annular path.

Gang cutters of one sort or another have been used for many years, but there has never been available a gang cutter where the individual cutting bits were of a hard cutting material and were designed to be replaced when worn and adjusted periodically to present a new cutting face to the work.

Cutting bits are available made of some exceedingly hard cutting material such as tungsten carbide, which bits are circular as to their cutting face so that they may be periodically rotated about their axes to present a new cutting edge to their work.

The cutting bits mentioned above have been found to be very desirable because they have a much longer wear and additionally, they can be used for a longer time by periodic rotation about their axes. It is therefore an object of my invention to provide a gang cutter using circular face cutting bits.

It is another object of my invention to provide for the cutting bits, bit holders with respect to which the bits may be rotated when it is desired to present a new cutting face to the work.

It is still another object of my invention to provide a holder for the bit holders wherein the bit holders are tightly clamped and oriented, and whereby the bits may be loosened axially so that they may be rotated if desired.

It is yet another object of my invention to provide means for adjusting the angularity of the tool holder with respect to the work to vary the size of cut which will be taken.

These and other objects of my invention, which I shall point out in more detail hereinafter, or which will appear to one skilled in the art as the description proceeds, I accomplish by that certain construction and arrangement of parts of which I shall now describe an exemplary embodiment. Reference is made to the drawings forming a part hereof and in which.

Briefly, in the practice of my invention, I provide a plurality of cutting bits and an equal number of bit holders, together with means for locating each bit with respect to its bit holder. I provide a member having a seat for the bit holders together with means for orienting the bit holders with respect to their seat, and means for clamping the bits and bit holders axially in position. The member which seats the bit holders is arranged for adjustment rotationally to vary the depth of cut.

Referring now in more detail to the drawings, I have shown a portion of a machine tool head at 10, and a conventional clapper box at 11. The clapper box is provided with clamps 12 for clamping a conventional cutting tool in position. The tool, according to my invention, is provided with a shank 13 which is clamped to the clapper box in conventional manner.

Figure 2:
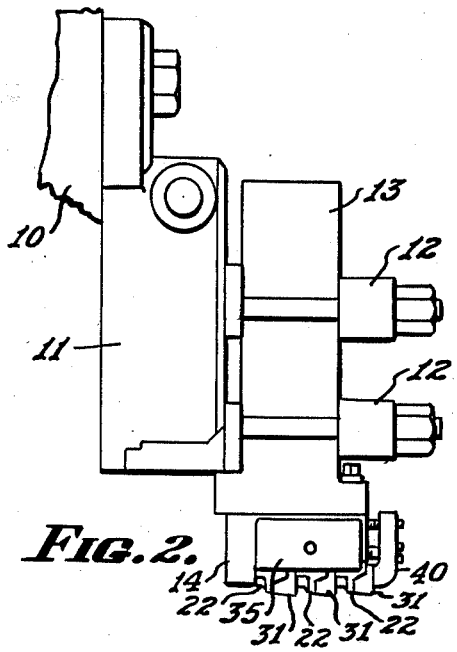
Figure 2 is a side elevational view of the same as seen from the left of Figure 1.
Figure 1:
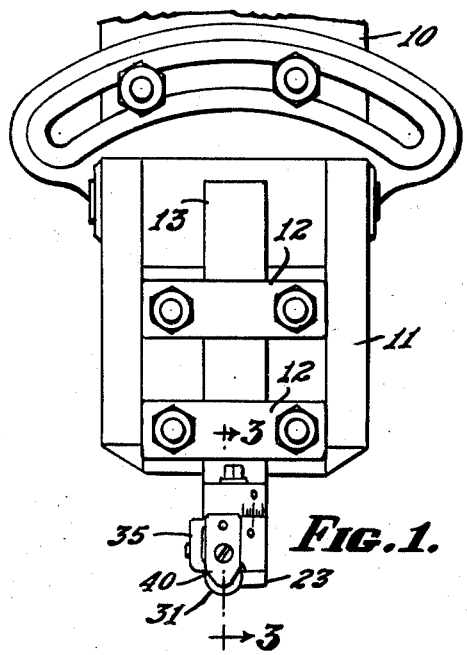
Figure 1 is a front elevational view of a machine tool head showing particularly the clapper box, or the like, with my novel gang cutter in position.
Figure 3:
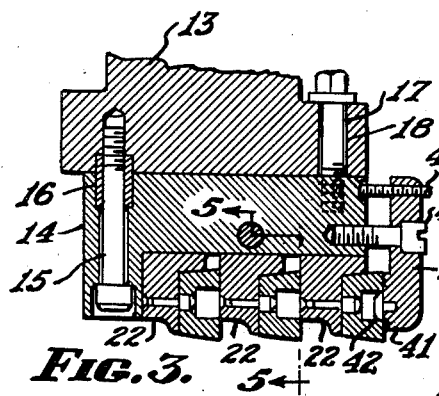
Figure 3 is a cross-sectional view taken on the line 3—3 of Figure 1 on an enlarged scale.

Pivotally secured to the lower face of the shank 13 is a tool holder member indicated generally at 14. The member 14 is secured to the thank 13 by means of a bolt 15 provided with a bearing sleeve 16 and threaded into the member 13, as best seen in Figure 3. The bolt 15 thus serves as a pivot point for the member 14 with respect to the member 13.

Figures 4, 5:
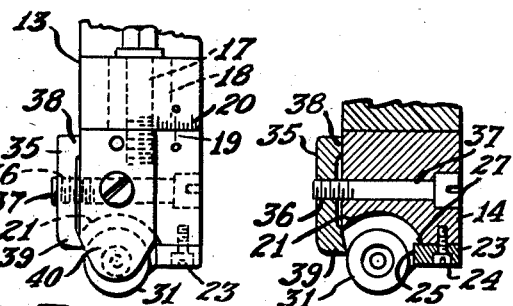
Figure 4 is a front elevational view taken from the right of Figure 3.
Figure 5 is a fragmentary cross-sectional view taken on the line 5—5 of Figure 3.

A bolt 17 passes through an arcuate slot 18 in the member 13, and is threaded into the member 14, so that by loosening the bolt 17 the member 14 may be pivoted slightly about the bolt 15 and clamped in a desired position of adjustment by tightening the bolt 17. As best seen in Figure 4 an index is preferably provided on the member 14 as indicated at 19 and a scale 20 may be provided on the shank 13. The calibrations may be, for example, $\frac{1}{16}''$ each so that if the index 19 is set opposite the fourth index to the right of zero on the scale 20 the displacement laterally between the first and last bits will be $\frac{1}{4}''$ and the depth of cut will be $\frac{1}{4}''$. The tool holder member 14 is provided with a cylindrical seat 21 against which the external cylindrical surfaces of the bit holders 22 rest. A shoulder provided by the bar 23 which is bolted to the member 14 as at 24, interrupts the cylindrical surface to provide a shoulder 25.

The bit holders themselves, indicated at 22, have the cylindrical external surfaces 26 which match the surface 21. The bit holders are also provided with the lips 27 which are adapted to engage the shoulder 25 to orient the bit holders with respect to the tool holder. One side of the bit holder has an angular configuration as at 28 for a purpose which will be described hereinafter.

Each bit holder has an internal conical surface 29 and is provided with a bore 30. The bits themselves are of conventional form being frusto conical in shape, and are indicated generally by reference numeral 31. These bits generally have a counterbored aperture 32 therein.

Figure 6:
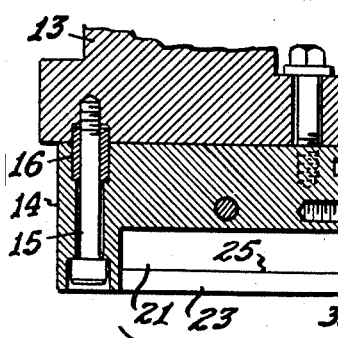
Figure 6 is an exploded view similar ot Figure 3 showing the relationship of the bits, bit holders and tool holder.
Figure 7:
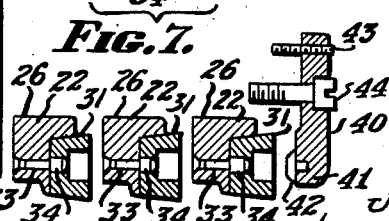
Figure 7 is an exploded view of a bit and bit holder in cross-section.
Figure 8:
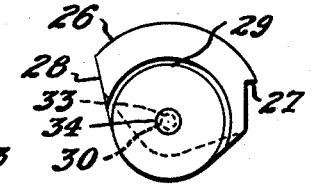
Figure 8 is a front elevational view of a bit holder as seen from the right of Figures 6 or 7, on an enlarged scale.

To locate the bits with respect to their bit holders I utilize the headed pins 33 having a shank engaging snugly in the bore 30 of the bit holder and having a head 34 of a size to engage snugly in the bore 32 of the bit. Thus, as best seen in Figure 6, each bit 31 is located with respect to its bit holder 22 by means of a pin 33. In the condition shown in Figure 6 each bit 31 may be easily rotated on the head 34.

In assembling the bit holders they are placed as shown in Figure 3 and clamped in place by means of two clamps. The first clamp, as best seen in Figures 4 and 5 comprises a plate 35 having a threaded hole 36 for a bolt 37, passing through the member 14. The clamping plate 35 has a heel portion 38 which bears against the member 14 and the toe portion 39 having an angular tip to conform to the angularity 28 of the bit holders. It will be clear from a consideration of Figure 5 that upon tightening the bolt 37 the toe 39 of the clamping plate 35 exerts an inward and upward component of clamping force so as to hold the cylindrical outer surfaces of the bit holders tightly against the cylindrical seat of the tool holder and to exert (as seen in Figure 5) a clockwise turning movement to insure engagement of the lip 27 with the shoulder 25. Thus the clamping plate 35 when acted upon by the bolt 37 orients and clamps all the bit holders against movement except in an axial direction.

The bits and bit holders are clamped axially by means of a second clamp indicated generally at 40. This clamp has a portion 41 carrying a nose 42 of frusto conical configuration which is arranged to engage in the counterbored portion of the first bit. An adjusting screw 43 is threaded through the clamp 40 and bearing against the member 14 serves as a fulcrum, and clamping pressure is produced by means of the bolt 44 threaded into the member 14. It will thus be clear that the bits and bit holders are now tightly clamped in position. If it is desired to rotate the bits slightly to present a new cutting face, the bolt 44 and the bolt 37 are slightly loosened, whereupon each bit 31 may be rotated with respect to its bit holder. The bolts 44 and 37 are again tightened and the bits are tightly clamped in their new position.

It will be clear that numerous modifications may be made without departing from the spirit of my invention, I therefore do not intend to limit myself otherwise than as pointed out in the claims which follow.

Having now fully described my invention what I claim as new and desire to secure by Letters Patent is:

1. A gang cutter for machine tools of the planer type, comprising a plurality of cutting bits and an equal number of bit holders, means for locating said bits with respect to said bit holders, a member having a seat for said bit holders and provided with means for orienting said bit holders and means for clamping said bits and holders tightly in place, a shank for mounting said member and means pivotally mounting said member on said shank, and means for clamping said member in a desired position of rotation with respect to said shank.

2. A gang cutter for machine tools of the planer type, comprising a plurality of frusto-conical cutting bits and an equal number of bit holders provided with matching frusto conical seats, means for locating said bits with respect to said seats, a member having a seat for said bit holders and provided with means for orienting said bit-holders and means for clamping said bits and holders tightly in place, a shank for mounting said member and means for clamping said member in position with respect to said shank.

3. A gang cutter for machine tools of the planer type, comprising a plurality of frusto-conical cutting bits and an equal number of bit holders provided with matching frusto-conical seats, means for locating said bits with respect to said seats, said bit holders having a cylindrical external surface, a member having a cylindrical surface seat for said bit holders and provided with means for orienting said bit holders and means for clamping said bits and holders tightly in place, a shank for mounting said member and means for clamping said member in position with respect to said shank.

4. A gang cutter for machine tools of the planer type, comprising a plurality of frusto-conical cutting bits and an equal number of bit holders provided with matching frusto-conical seats, means for locating said bits with respect to said seats, said bit holders having a cylindrical external surface, a member having a cylindrical surface seat for said bit holders, said cylindrical seat having a shoulder and said bit holders having a lip engageable with said shoulder to orient said bit holders with respect to said cylindrical seat, means for clamping said bit holders in position in said seat, said means exerting a turning moment to insure proper orientation of said bits with respect to their seat, means for tightly clamping said bit and bit holders axially with respect to said member, a shank for mounting said member and means for clamping said member in position with respect to said shank.

5. A gang cutter for machine tools of the planer type, comprising a plurality of frusto-conical cutting bits and an equal number of bit holders provided with matching frust-conical seats, said bits having axial bores and said bit holders having bores axially of said seats, headed pins fitting in the bore in each bit holder and the heads of said pins extending into the bores in said bits to locate said bits with respect to said bit holders, said bit holders having a cylindrical external surface, a member having a cylindrical surface seat for said bit holders and means for clamping said bits and holders tightly in place, a shank for mounting said member, and means for clamping said member in position with respect to said shank.

6. A gang cutter for machine tools of the planer type, comprising a plurality of frusto-conical cutting bits and an equal number of bit holders provided with matching frust-conical seats, means for locating said bits with respect to said seats, said bit holders having a cylindrical external surface, a member having a cylindrical surface seat for said bit holders, said cylindrical seat having a shoulder and said bit holders having a lip engageable with said shoulder to orient said bit holders with respect to said cylindrical seat, said bit holders having an outwardly sloping side opposite said lip, a clamp for clamping said bit holders to said seat, said clamp having an inwardly sloping edge engageable with the outwardly sloping sides of said bit holders whereby to exert upon said bit holders a turning moment in a direction to insure tight contact between said lips and shoulder, means for tightly clamping said bits axially with respect to said member, a shank for mounting said member and means for clamping said member in position with respect to said shank.

JOHN M. WALTER.

REFERENCES CITED

The following references are of record in the file of this patent:

UNITED STATES PATENTS

| Number | Name | Date |
|---|---|---|
| 1,458,802 | Bufford | June 12, 1923 |
| 2,258,163 | Peters et al. | Oct. 7, 1941 |

FOREIGN PATENTS

| Number | Country | Date |
|---|---|---|
| 731,892 | France | Sept. 9, 1932 |